Patented Aug. 19, 1941

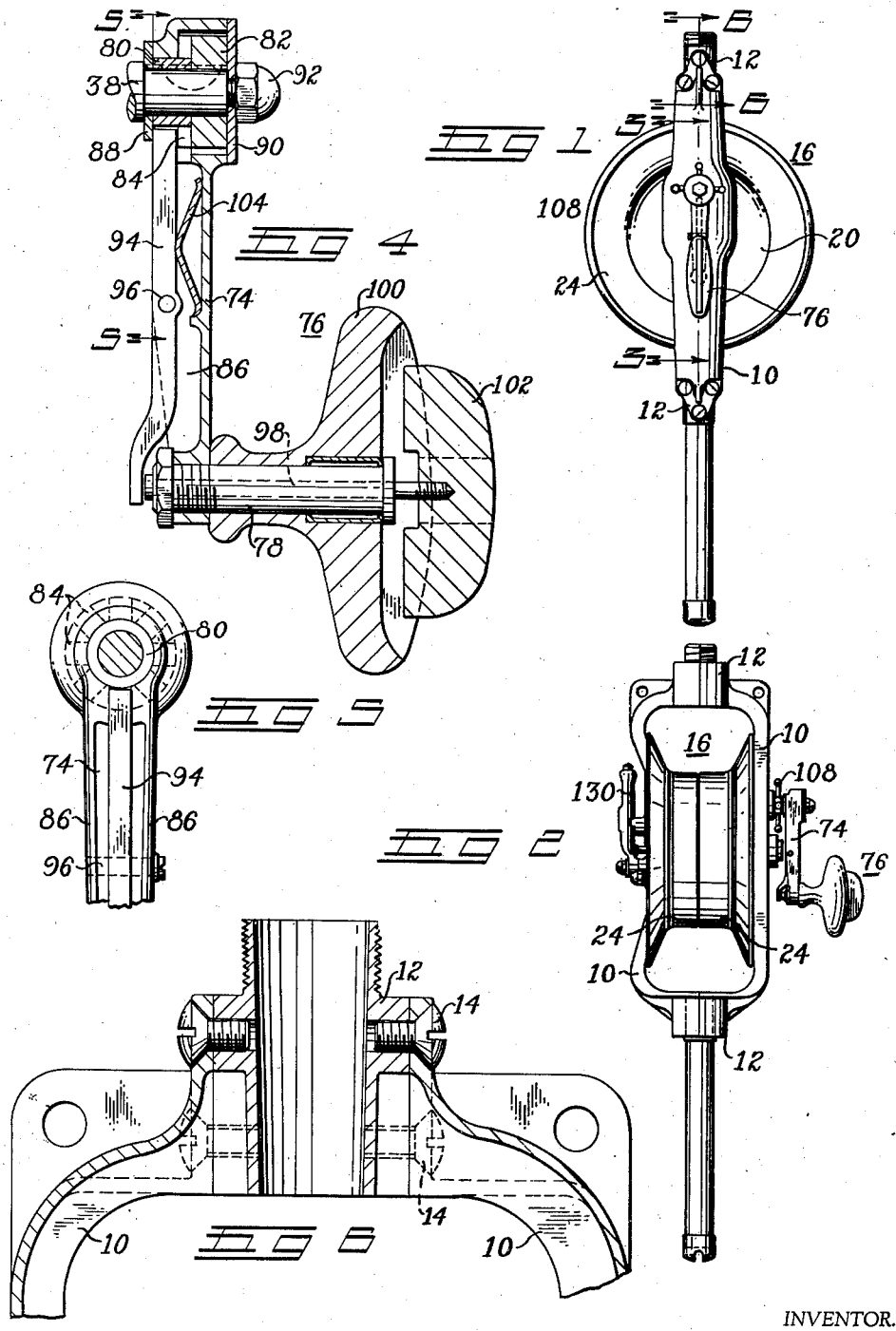

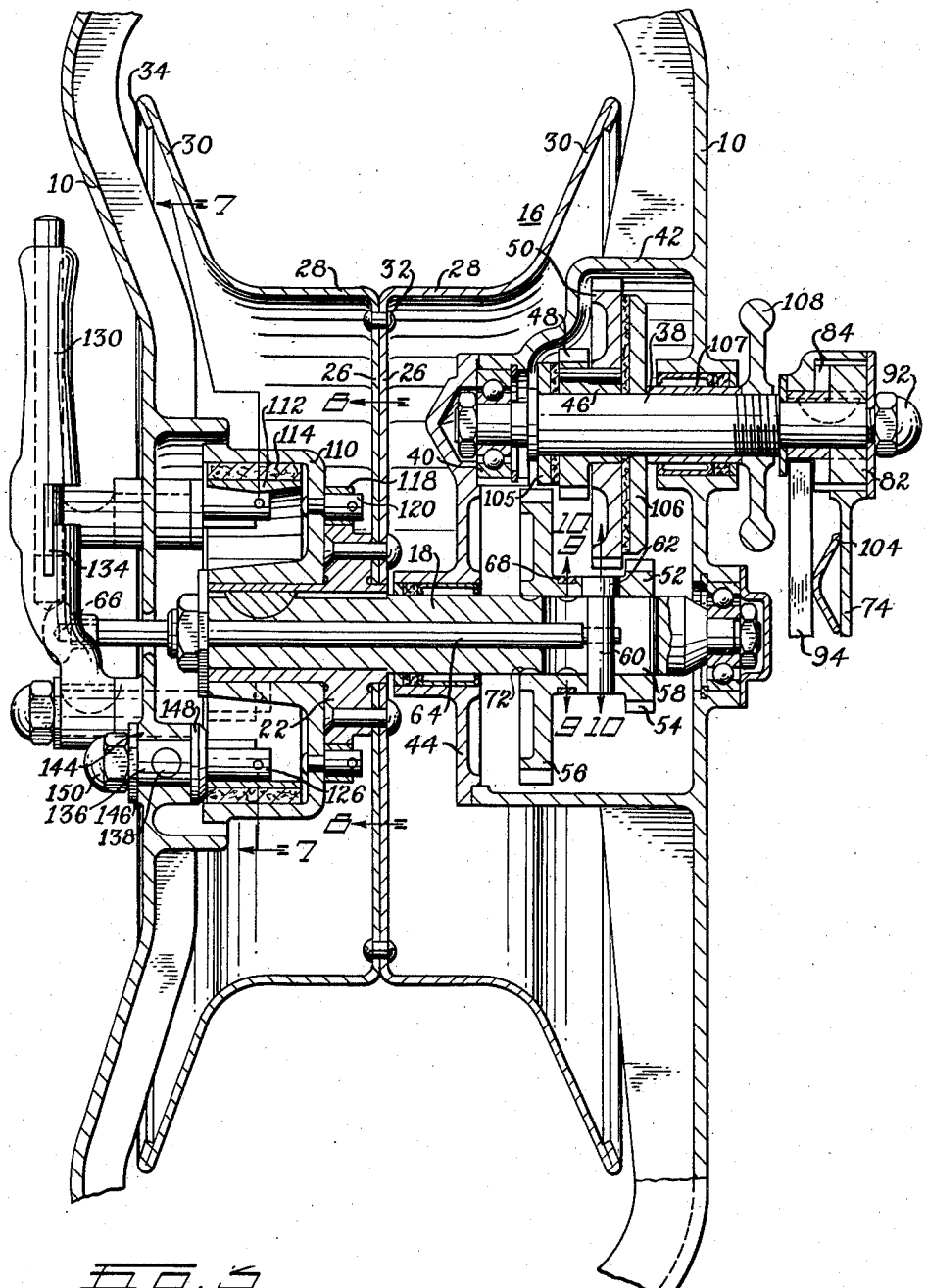

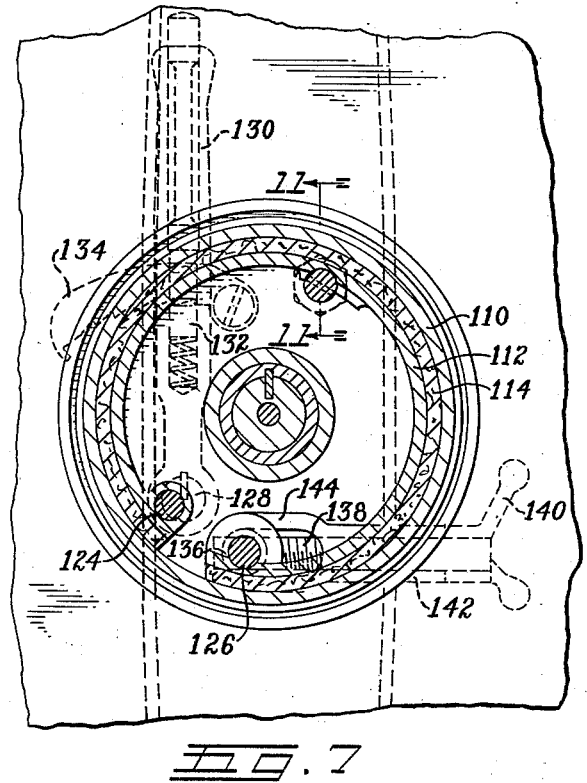
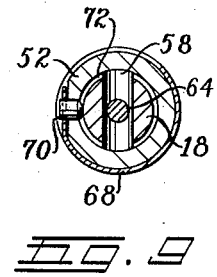
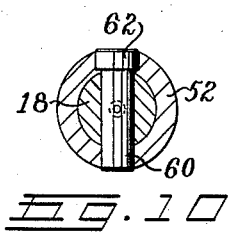
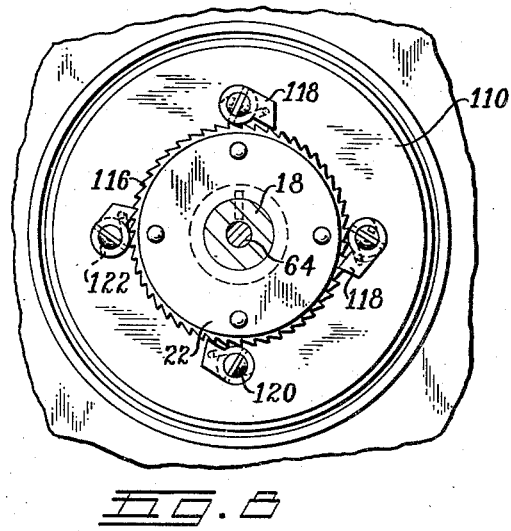
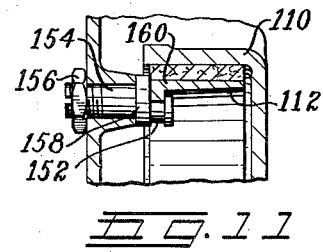

2,252,777

UNITED STATES PATENT OFFICE 2,252,777

DEEP SEA FISHING REEL

Walter D. Marr, Flint, Mich.

Application January 30, 1939, Serial No. 253,568

6 Claims. (Cl. 242—84.5)

This invention relates to improvements in fishing reels particularly designed for deep sea fishing and forms a further development of the invention described in my copending application Serial No. 194,336, filed March 7, 1938, now Patent No. 2,184,149.

An important object of this invention is to provide an improved fishing reel structure of the type described in my copending patent which is economical to construct and assemble and which requires only very slight changes in a few parts of the reel to adapt the winding drum and associated operating parts to any size of fishing reel.

Another object of this invention is to improve the operator's control of the winding drum by providing improved means for varying the drive from the handle to the winding drum and improved means for snubbing or retarding the paying-out of the fishing line. A further object is to provide a novel variable friction drive between the operating handle and the winding drum which is capable of automatically limiting the driving force with which the operator can wind in the line and thus keep the tension on the fishing line within its breaking limit. A further object of the invention is to provide improved means readily accessible to the operator for instantly varying the friction drive while the reel is in use.

A meritorious characteristic feature of the invention is the form of construction of the speed change gears comprising the variable drive between the operating handle and the winding drum. These gears are arranged for high, low and neutral driving relations. They are assembled on two hub members, one of which is axially shiftable along a shaft into any one of the three positions mentioned. Novel selector control means is employed for shifting the movable hub member. The other hub member is carried on another shaft in the reel and forms a part of the friction clutch mechanism previously referred to. It is freely rotatably supported on the shaft and frictionally gripped between members of the friction drive.

Various other objects, advantages and meritorious features will become more fully apparent from the following specification, appended claims, and accompanying drawings wherein:

Figure 1 is a side elevation of a reel embodying the invention,

Fig. 2 is an elevation of the same reel taken at a 90° angle with respect to Fig. 1.

Fig. 3 is a vertical sectional view taken on line 3—3 of Fig. 1, but showing the structure enlarged, Fig. 4 is a sectional view through the manually operable handle showing the manner of disengageably coupling the handle to a handle drive shaft, Fig. 5 is a fragmentary elevational view of the handle arm shown in Fig. 4, Fig. 6 is a detail view of one end of the frame in which the winding drum is journaled showing the manner of connecting the yoke arms of the frame to a collar, Fig. 7 is a sectional view taken along line 7—7 of Fig. 3, Fig. 8 is a sectional view taken along line 8—8 of Fig. 3, Fig. 9 is a detail sectional view taken along line 9—9 of Fig. 3, Fig. 10 is a detail sectional view taken along line 10—10 of Fig. 3, and Fig. 11 is a detail sectional view through the brake drum of the reel showing the manner of varying the position of the brake band.

The embodiment of the invention herein is similar in several respects to the embodiment of the invention described and claimed in my copending patent. Like the structure illustrated in my copending patent, it comprises a yoke frame between the spaced arms of which a winding drum shaft is journaled. A drum for winding and unwinding the fishing line is secured to the shaft. In order to provide for compactness of assembly, the winding drum is shaped with a single central radial support fixed on the shaft leaving space on opposite sides thereof for associate operating parts. On one side of the frame, preferably the right side, an operating handle is provided for winding the drum. On the opposite side of the frame, a brake control handle and a gear selector control knob is located. A speed change gear mechanism is provided between the operating handle and the winding drum and special provision is made for housing this mechanism within the plane of the outwardly flaring edges of the winding drum. Similarly, the brake mechanism is housed on the opposite side of the winding drum. As in the embodiment disclosed in my copending patent, the gear selector control operates axially through the winding drum shaft and is provided on its inner end with a gear shift key for selectively controlling the drive relation between the operating handle and the winding drum.

Referring specifically to the illustrated embodiment of the invention herein and particularly to the novel features thereof, the frame is constructed in an improved manner in order that it may be used interchangeably for various sizes of fishing reels. Instead of as in my copending patent integrally joining the ends of the side arms of the frame to sockets and thus restrict the arms to one size of a fishing reel, the present invention contemplates providing a mode of connection which enables the side arms of the frame yoke to be assembled on sockets of different diameters. As shown in the accompanying drawings, the two spaced arms of the yoke are indicated at 10—10. Their middle portions serve as supports for the winding drum and associate operating mechanisms. The opposite extremities of these arms are turned toward one another and are shaped for engagement with a supporting member such as sockets or collars 12 for receiving a pole or like support.

As shown clearly in Fig. 6, the arms 10 and the sockets 12 are separately formed and detachably secured together by screws 14. Other means of securement may be used if desired. As previously explained, this mode of construction and assembly enables the same arms to be used for different sizes of reels. The size of the reel is in this particular instance determined by the width and winding capacity of the drum and the size of the braking mechanism. For smaller reels, it is contemplated providing drums of smaller size and reducing the area of the braking surface. For larger reels, the winding drums will be wider and have a greater line capacity and larger braking provisions will be necessary. Widening of the winding drums and enlarging the size of the braking mechanism will increase the transverse dimensions of the reel. In the illustrated embodiment of the invention in my copending application, it would be necessary to use different sets of arms for the different sizes of fishing reels. In the present invention, the same set of arms can be used irrespective of the size of the reel. All that is necessary to do is to increase or decrease the sizes of the end supports such as the sockets 12 to which the arms are connected. The advantage of this form of construction in commercial production is obvious.

Rotatably supported within the framework formed by the arms 10—10 is the winding drum 16. A winding drum shaft 18 has its opposite ends journaled in the arms of the framework. The winding drum generally indicated at 16 is provided with a central radial support or web 20 which is operatively secured through the medium of a sleeve 22 to the shaft 18. A fishing line is secured to the winding drum in a conventional manner and wound or unwound thereon.

The winding drum proper is formed in a novel manner which expedites the manufacture of the reel. It is formed as shown in Fig. 2 of two complementary half sections 24—24. Each half section is formed of sheet metal stock and die stamped into a dish-shaped formation having a flat bottom portion 26, a circular side portion 28 and an outwardly flaring circular edge or rim 30. The flat bottom portion 26 of each half section are secured to one another such as by rivets 32. The outer edge of the flaring rims 30 are folded as at 34 to provide a rounded edge which will not snag the line. The flat bottom portions of each half section of the drum form the previously described single central support or web for the drum.

The drum shaft 18 is adapted to be driven at varying rates of speed from the operating handle through an improved change speed gearing illustrated in Fig. 3. The handle is detachably mounted, as will be later described, upon a drive shaft 38 to drive the same. The drive shaft is rotatably journaled at its inner end by bearing 40. This bearing is mounted in a wall of a housing formed of two sections, one section 42 of which is integral with the frame arm 10 on the right side of the reel, and the other section 44 of which is fixed at its outer end to the other section and centrally apertured for support on the shaft 18 as shown in Fig. 3. The housing encloses the gear change mechanism and is made tight so that the gears may run in lubricant.

Freely rotatably mounted on the driving shaft 38 is a hub member 46 carrying a small gear 48 and a large gear 50. The latter gear may be pinned to the hub member as shown. Fixed to the drum shaft 18 but slidable therealong is a hub member 52 carrying a small gear 54 and a large gear 56. The small gear 54 on hub 52 is adapted to mesh with the larger gear 50 on hub 46. The larger gear 56 on hub 52 is adapted to mesh with the smaller gear 48 on hub 46.

As previously described, the hub member 52, carrying gears 54 and 56, is slidable along the drum shaft. It is, however, coupled to the shaft for joint rotation. Its position on the shaft is controlled by novel gear selector mechanism. As shown in Figs. 3 and 9, the drum shaft 18 is slotted diametrically at 58. Extending transversely through this slot is a selector key member 60 whose opposite ends project beyond the shaft and are fitted into the hub 52. One end of the key 60 is enlarged to form a head 62 which facilitates assembly. The selector key 60 is bodily moved through the slot 58 by means of a rod 64 axially mounted in the shaft 18. This rod projects to the outside of the reel and carries a push-pull control knob 66. The arrangement of parts is such that when the control knob 66 is thrust inward as far as it will go the key 60 will abut the right end of slot 58 and bring the large gear 56 into mesh with small gear 48 on the driving shaft; and when the control knob 66 is pulled out as far as it will go the key 60 will abut the left end of the slot 58 and bring the small gear 54 into mesh with the larger gear 50 on the drive shaft. In Fig. 3, the control knob 66 and selector key 60 are in a position equidistant between the extreme position of their movement. In this position neither set of gears is in mesh and the driving connection between the two shafts is broken. This may be referred to as the neutral position.

To releasably hold the gear selector mechanism in anyone of the three positions and to indicate to the operator that he is in one of these positions, the hub member 52 is provided with a spring pressed detent engageable in grooved sections of the shaft 18. As shown in Fig. 9, the hub 52 is recessed to provide a flat bottom peripheral groove into which is sprung a flexible flat metal ring 68 of spring steel. The peripheral groove is flattened on one side and the ring 68 is correspondingly bent and shaped to lie against this flattened section of the groove. At this point the ring carries a detent member 70 reciprocal in a hole provided through the hub. The inner end of the detent is rounded, as shown. At spaced points along the drum shaft corresponding to the three positions of the gear shift mechanism, peripheral grooves 72 are provided into which the rounded end of the detent 70 can project. It is obvious that by this construction the hub is manually releasably held in any one of the three positions to which it is shifted.

As previously mentioned, the operating handle is detachably connected to the drive shaft 38. The handle comprises the arm 74 and a hand gripping portion generally indicated at 76 freely rotatable on a bearing stud 78 fixed to the free end of the arm. The opposite end of the arm is freely rotatable about a bushing 80 and a member 82 both keyed to the outer reduced end of the drive shaft. Member 82 is oversize the bushing and is provided on its inner face with radial teeth 84. The arm 74 of the handle is provided with spaced parallel ribs 86 which at the connection of the arm to the drive shaft extend around the latter and form, as shown in Fig. 5, a housing enclosing the teeth 78. Washers 88 and 90 complete the enclosure and nut 92 holds the assembly in place.

Disposed within the groove formed by the ribs 86 of the arm is a member 94. It is swingably or rockingly mounted intermediate its ends about a pivot pin 96. The end adjacent the drive shaft is shaped to fit the radial teeth 84. The opposite end of member 88 overlies the axis of the stud 78 as shown in Fig. 4. Stud 78 is cored cut axially and reciprocally mounted therein in a pin 98. This pin projects from opposite ends of the stud. The hand gripping portion of the handle is composed as shown in Fig. 4 of two parts, a larger egg-shaped part 100 freely rotatable on stud 78 and a smaller elongated part 102 fitted to the outer projecting end of the pin 98. The egg-shaped part 100 is grooved diametrically along the long axis to receive the smaller elongated part 102 when the latter is pressed thereinto.

It is obvious from the construction of the handle that when the part 102 of the hand grip portion is compressed into the groove of the larger part such as by increasing the grip of the hand on the handle, the pin 98 will be projected from the inner end of stud 78 and rock member 94 and cause the opposite end to engage with the teeth of member 82. This will operatively couple the handle to the drive shaft. This action is made against the yielding resistance of a flat spring member 104 seated within the groove provided by the ribs 86. This spring member functions when the hand grip on parts 100 and 102 is loosened to automatically return the member 94 to its initial operating position and disengage the handle from the drive shaft. The diametrical groove in the egg-shaped part 100 and the elongated smaller depressible part 102 are shaped and associated together in the manner shown and described to facilitate ease in operation. As a result of their shape the operator can use the reel for long periods of time without tiring or injuring his hand.

As previously described, the handle is operatively coupled to the drum through novel mechanism which limits the pull the operator may exert on the line, and automatically prevents the operator from exerting a greater pull than that allowed by the mechanism. This mechanism comprises a friction clutch associated in an improved manner with one of the gear hubs of the speed change mechanism. As shown in Fig. 3, the hub 46 on the drive shaft is mounted between two discs 105 and 106 each having friction faces engageable with adjacent surfaces of the hub and the gears 48 and 50 carried thereby. One of these friction discs, the larger of the two in the embodiment of the invention, namely, disc 106, is slidably keyed to the drive shaft as shown.

Means for forcing the discs into frictional engagement with the hub 46 and for holding the same at the degrees of engagement to which they are adjusted, comprises a sleeve 107 encircling the drive shaft and extending from the disc 106 against which it abuts to the outside of the housing in which the gear mechanism is enclosed. A hand wheel 108 threaded to the drive shaft 38 abuts the outer end of sleeve 107. It is obvious that upon threaded adjustment of the hand wheel that the latter will vary the thrust of the sleeve against the disc 106 and thereby vary the frictional force with which the discs grip the hub member 46. In the construction shown, the sleeve 107 also serves in a novel manner as a part of the journal for the drive shaft in the outer wall of the housing.

Mechanism is employed on the opposite side of the reel from the speed change mechanism for retarding or snubbing the unwinding rotation of the drum. It is similar in general to that shown and claimed in my copending application but differs in several important novel respects. As in my copending application, a brake drum 110 is freely rotatable about the sleeve 22 to which the central web of the winding drum is secured. As in my copending application, the brake friction mechanism comprises an internally expanding brake band 112 carrying a suitable friction facing 114.

The sleeve 22 carries a ratchet wheel portion 116 between the back side of the brake drum and the supporting web of the winding drum. Mounted on the back side of the brake drum as best shown in Fig. 8 are a plurality of circumferentially spaced pawls or dogs 118. Each pawl is rotatably carried upon a stud 120 and a coiled spring 122 yieldingly urges the pawl into engagement with the teeth of the ratchet wheel. The pawls are arranged in a novel way so that only a portion of the entire number fully engage with the teeth of the ratchet wheel while the remainder are poised ready to engage with the next succeeding teeth on the ratchet wheel. This is accomplished by spacing the pawls not quite equidistant from one another. It is preferred as shown in Fig. 8 that the diametrically opposite pawls be similarly mounted to act the same way on the teeth of the ratchet wheel. The ratchet wheel is formed so that when the winding drum is operated to haul in the line the pawls click inoperatively over the ratchet teeth, but when the drum unwinds, the pawls engage the teeth and cause the brake drum to rotate therewith.

The brake band 112 has its opposite ends adjustably mounted on brake operating pins 124 and 126. Operating pin 124 is eccentrically mounted on the inner end of a second larger pin 128 which has a bearing in the arm 10 of the yoke frame and extends therethrough to the outside of the reel where an operating brake lever 130 is fixed thereto. It is obvious that swinging movement of the lever will shift the end of the brake band to which pin 124 is attached either toward or away from the inner surface of the brake drum. The brake lever is releasably held in adjusted positions by means of a hand controlled spring pressed detent 132 which engages in the notches of a tooth quadrant 134.

The other eccentric operating pin 126 is mounted in an improved manner for movement along a chord of the circle encompassed by the brake band. It extends laterally from a nut 136 threaded on screw or worm 138. The latter projects from one side of the arm 10 of the yoke frame and is provided with a handle 140 for manual control. The worm 138 turns in a sleeve 142 which is enlarged at 144 to provide a path of travel for the nut 136. The nut has an outside cylindrical formation which rides in the enlarged portion of sleeve 142. Washers 146 and 148 (Fig. 3) on opposite sides of the nut hold the latter in place within the enlarged section 144 of the sleeve 142. A tightening nut 150 retains the washers in place against the sleeve and completes the assembly of this unit. It is obvious from this description that upon turning the handle 140, the nut 136 will travel toward one of the ends of the enlarged section 144 and carry the end of the brake band mounted on the pin 126 therewith. This action will cause the brake band either to contract or expand in size depending upon the direction of rotation of handle 140 and thus vary the maximum braking force applied to the drum as well as the time when the operating lever 130 affects initial braking.

The brake band is also supported intermediate its ends by a positioning pin 152. Unlike the similar positioning pins in my copending application, this pin is constructed so that upon rotation it adjusts the brake band either closer or farther away from the inner surface of the brake drum. As shown best in Fig. 11, the positioning pin of the present embodiment is eccentrically carried by a bolt 154 which projects to the exterior for adjustment. A lock nut 156 cooperates with a shoulder 158 on the bolt to hold the same in adjusted position. The brake band is provided with a depending lip 160 along that portion of its extent which the eccentric pin 152 engages.

What I claim is:

1. A fishing reel comprising, in combination, a frame, a winding drum shaft rotatably supported on said frame, a handle having a shaft rotatably supported in the frame, mechanism operatively coupling the handle shaft with the drum shaft including a hub member on each shaft, each hub member having at least two gear wheels of different sizes arranged for separate engagement with gear wheels on the other hub member, one of said hub members mounted for axial movement relative to its shaft, the other hub member normally held against axial movement on its shaft but connected thereto for joint rotation, and a selector control means operable axially through the shaft carrying the axially movable hub and connected to the hub for shifting the hub member and changing the engagement of the gear wheels on this member with those on the other hub member.

2. A fishing reel comprising, in combination, a frame, a winding drum having a shaft journaled on said frame, a handle controlled shaft, mechanism operatively coupling said shafts including a hub member on each of the shafts, one of said hub members being fixed to its shaft against rotation relative thereto but slidable axially therealong, at least two gear wheels of different diameters carried by each hub member, said gear wheels arranged in their respective hub members in such a way that upon shifting the axially movable hub to one extreme position of its movement a gear wheel of one hub member meshes with a gear wheel of the other hub member and upon shifting the hub member to the opposite position of its movement the remaining gear wheels of each hub member are meshed together, and upon shifting the axially movable hub member to an intermediate position of its movement all gear wheels of the hub members are out of engagement with one another, means controllable from the outside of the reel for shifting the axially movable hub member along its shaft including a member extending axially through the shaft and bodily reciprocal therein, and means connecting the member to said axially movable hub for shifting the latter.

3. In a fishing reel, a winding drum, a brake mechanism for retarding rotation of said drum including a brake drum, means connecting said brake drum to said winding drum for joint rotation when the latter revolves in one direction, an internal expanding brake band engageable with the inner surface of the brake drum, means adjustably supporting the opposite ends of the brake band in the brake drum, an eccentrically mounted positioning pin acting to support an intermediate portion of the band adjacent to the brake drum, and means adjustable from outside the reel for rotating the position pin on its eccentric mounting and thus varying the position of the brake band with reference to the brake drum.

4. In a fishing reel structure, a speed change gear mechanism for driving the winding drum including a shaft, a hub shiftable axially along said shaft and carrying a set of gears, said shaft provided with a longitudinally extending slot opening through the side of the shaft and extending inward at least as far as the center thereof, a control member bodily reciprocal axially through said shaft and projecting into the longitudinal slot, a pin in said slot extending transversely to the control member and operatingly connecting the said projecting end thereof to the hub, said pin serving to control the shifting movement of the hub from the control member and also by virtue of its position in the slot to key the hub to the shaft for joint rotation therewith in whatever position it may be shifted.

5. In a fishing reel structure, a speed change gear mechanism for driving the winding drum including a shaft, a hub shiftable axially along said shaft and carrying a set of gears, said shaft provided with a longitudinal slot extending diametrically through the shaft and opening out through opposite sides of the shaft, a control member bodily reciprocal axially through the shaft and having an end projecting into the slot of the shaft, a pin of a length greater than the diameter of said shaft extending through the slot and having its opposite ends connected to said hub and its middle section connected to said projecting end of the control member, said pin serving to control the shifting movement of the hub from the control member and also to key the hub to the shaft for joint rotation therewith in whatever position it may be shifted.

6. In a fishing reel, a winding drum, brake mechanism for retarding rotation of said drum including a brake drum, means connecting said brake drum to said winding drum for joint rotation in one direction, an internal expanding brake band for engagement with the inner surface of the brake, an adjustable support for each end of the brake band providing adjustment of the ends of the band relative to the inner surface of the brake drum, an adjustable support for an intermediate portion of the band providing adjustment of the portion of the band relative to the inner surface of the brake drum, and control means operable from outside the reel for separately adjusting the three supports.

WALTER D. MARR.